UNITED STATES PATENT OFFICE.

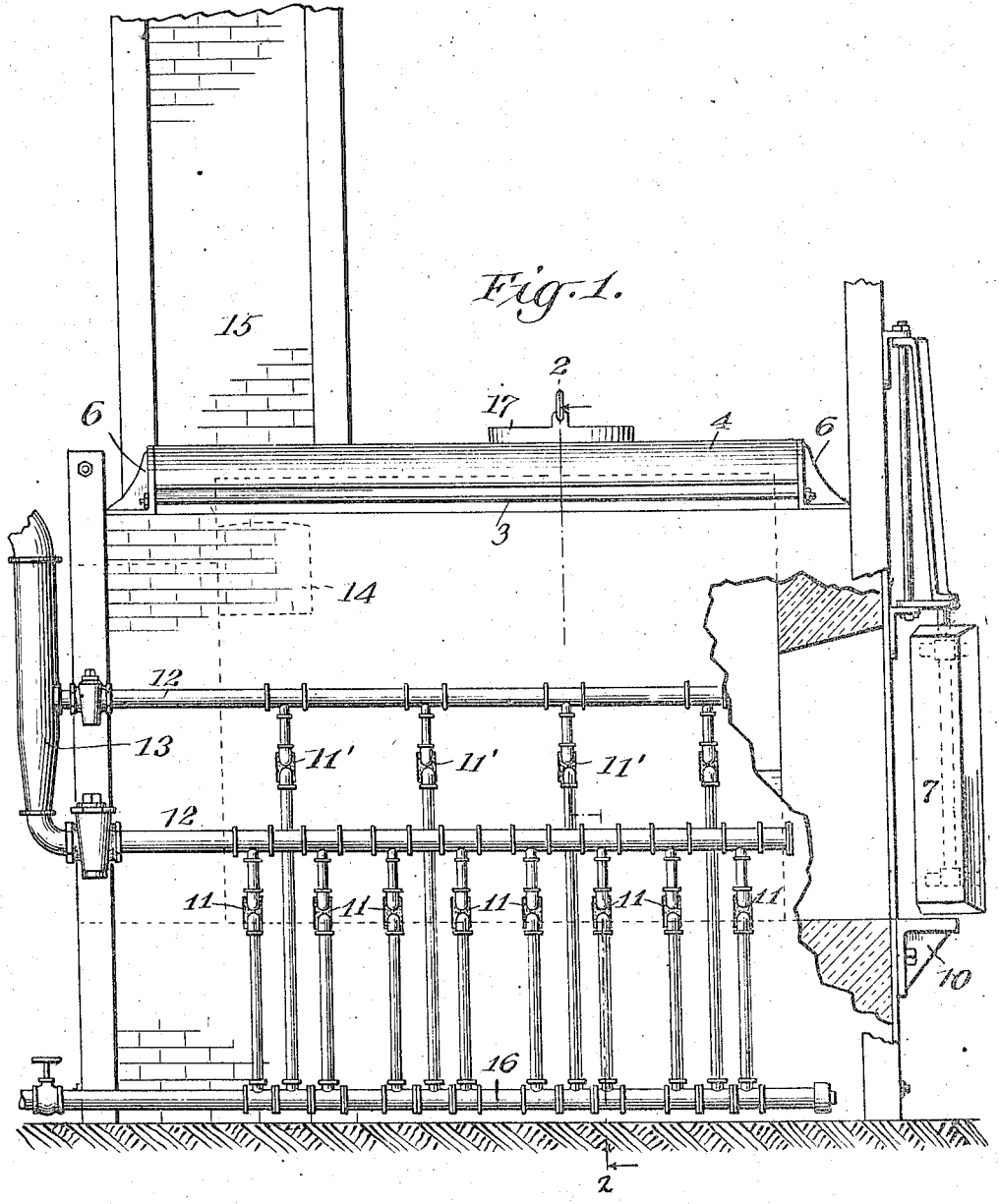

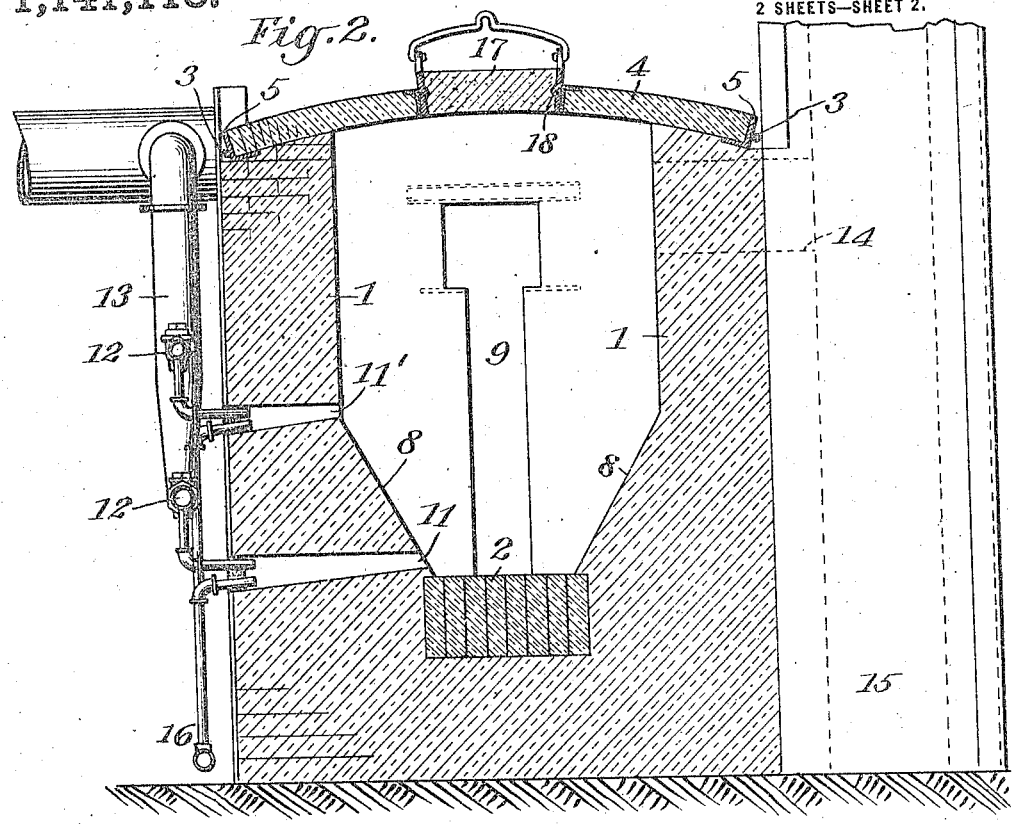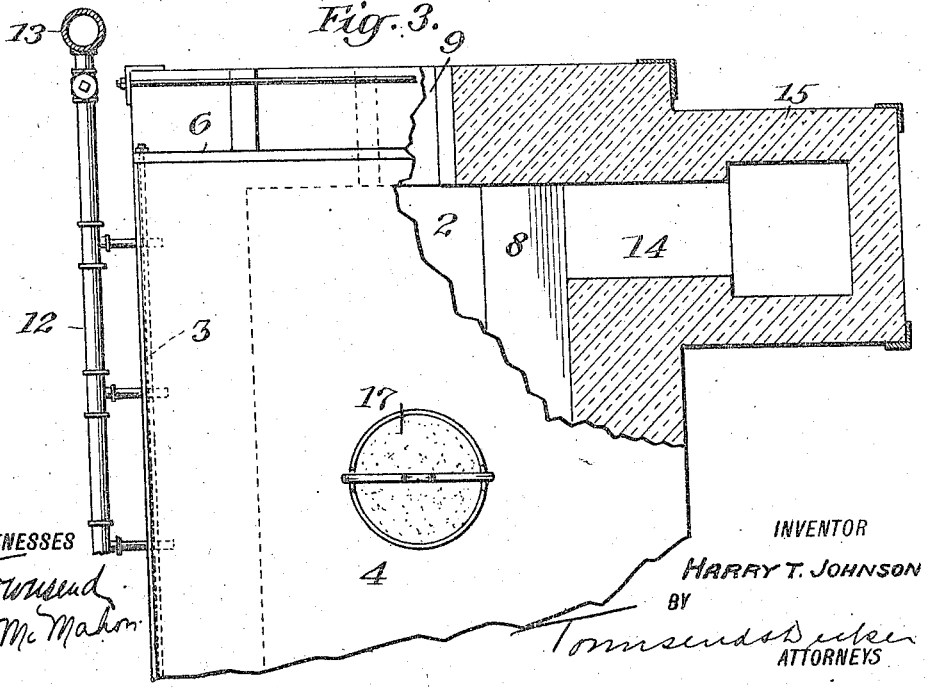

HARRY T. JOHNSON, OF NEW YORK, N. Y.; NETTIE F. JOHNSON ADMINISTRATRIX OF SAID HARRY T. JOHNSON, DECEASED.

KILN OR FURNACE FOR TREATMENT OF CARBONACEOUS MATERIALS.

1,141,118.  Specification of Letters Patent.  Patented June 1, 1915.

Application filed February 3, 1913. Serial No. 746,055.

*To all whom it may concern:*

Be it known that I, HARRY T. JOHNSON, a citizen of the United States, and a resident of New York, in the county of New York, and State of New York, have invented certain new and useful Improvements in Kilns or Furnaces for Treatment of Carbonaceous Material, of which the following is a specification.

This invention relates to the construction of furnaces or kilns for burning or calcining carbonaceous material such as petroleum coke to produce pure carbon suitable for battery or other electric uses.

The object of my invention is to provide a simple, compact and readily operable construction of furnace in which the operation of burning or calcining the coke may be so conducted as to thoroughly purify the same and remove therefrom all hydrocarbons or other foreign ingredients, leaving a perfectly pure carbon approaching pure graphite in electrical conductivity.

It has heretofore been proposed to construct furnaces for the operation of reducing petroleum coke to carbon in a manner analogous to a muffle furnace, although in some cases provision has been made for passing air and flame over the surface of the charge, but in such furnaces the operation of reducing coke cannot be expeditiously conducted and the resultant product is not entirely free from impurities.

My invention consists of the improved construction of furnace hereinafter described and more particularly specified in the claims.

In the accompanying drawings Figure 1 is a side elevation of my improved furnace. Fig. 2 is a cross-section on line 2—2 of Fig. 1. Fig. 3 is a partial plan view, partly in section.

1 indicates the walls of the furnace which are made up preferably of fire-brick in the usual manner and 2 represents a solid floor or bottom of the fire-pot in which the coke or other material is contained during the heating operation. This bottom is made of fire-proof tile preferably set on edge.

4 is the top for the fire-pot preferably made in arch form and constructed of brickwork laid up in a suitable iron frame 6. In the top is a hole or opening closed by the cover 17 through which the furnace may be charged. Said cover is constructed preferably as shown in Fig. 2, from a number of tiles, and is provided with a groove at 18 around its edge for holding a band of metal, which secures the parts together and may have a bail by which the cover may be lifted. The iron frame 6 for the top may have inclined sides 5 to allow the proper inclination for supporting the edge of the bricks forming the top and said sides may be connected together by bolts 3, as shown.

The fire-pot extends from front to rear, being closed at the front by a suitable door 7 mainly constructed of fire-brick and indicated at Fig. 1. The fire-pot itself has an inclined or hopper bottom as indicated by the inclined sides 8 extending from the side walls down to the solid floor or bottom 2 of the fire-pot which supports the material under treatment and serves to collect and retain the reduced product. In the rear wall is formed an elongated rather narrow vertical opening 9 also adapted to be closed by a door and serving for the insertion of a suitable tool by which the contents or charge of the furnace may be thoroughly broken up through its whole mass or extent vertically, so as to allow the air-blast, to be presently described, to reach every part of the charge during the whole operation.

The opening 9, as will be seen, extends down substantially to the level of the floor or bottom 2 and the floor or bottom 2 has its upper surface substantially in line with the lower edge of the opening which is closed by the front door 7. As shown, the opening 9 is somewhat enlarged at its top to permit the insertion of the working end of the hoe-shape tool, while the remainder of the opening is somewhat narrower to accommodate simply the rod to which the tool is attached and to further permit some lateral movement required in pushing out the heated mass through the opening which is closed by the door during calcination. The inclination of the lower portion of the side walls of the fire-pot prevents the accumulation of material in corners, where it would not be readily reached by the agitation tool or by the air and facilitates the thorough removal of the treated contents by pushing the same out through the front opening onto the shelf or ledge 10 and thence onto the floor or into a suitable receptacle.

At intervals along the side of the fire-pot, and opening into the same, horizontally extending ranges or series of air or gas ports are provided. One range or series of these is preferably provided in position as indicated at 11 so as to permit the injection of a combustible mixture of air and gas or gas or air alone into the charge near the bottom and are therefore arranged to introduce their draft or blast near the floor or bottom 2. Another series of ports may be provided as shown higher up, as for instance at point 11' where the inclination of the side wall begins. It is preferable to have a larger number of openings in the bottom row to insure a complete combustion and treatment of the material as it sinks to the bottom or floor from which it is withdrawn. The openings in the row 11' may be less in number and spaced farther apart as indicated.

The various ports may be fed with air from the pipes 12 from which extend branch pipes terminating in passages leading to the outlets of the ports 11, 11'. The pipes 12 may derive their supply from a main pipe 13 and each is provided with a suitable valve to regulate or control the flow of air. 16 is a suitable pipe employed for furnishing gas and connected with any source of supply. Said pipe is provided with branches or risers terminating in the spaces in which the branches of pipes 12 terminate. Suitable means, as a valve in the connection to pipe 16, are provided for stopping or regulating the flow of gas.

As will be seen, what I term ports 11, 11' are gas chambers formed or built in the side walls of the furnace and having their outlets flush with the side wall of the fire-pot, while the pipes which supply the air and the gas, either or both at will, terminate within said chambers at some distance rearwardly from the mouth or outlet into the fire-pot, so that no obstruction exists to the fall or flow of the material along the side and hopper portion of the fire-pot to the floor, while moreover the air and gas pipes themselves are protected from the heat. As the floor itself is solid or unprovided with any openings or means for introducing air or gas, it will be seen that there is nothing to interfere with the collection of all the material on the floor and the effectual removal from the fire-pot of all the product of the operation.

In the operation of the furnace, the charge of petroleum coke or other carbonaceous material is introduced into the fire-pot broken up into fragments of greater or less size as desired, and the operation is started by lighting the gas or combustible mixture of air and gas introduced through the ports 11 and 11' and allowed to flow until the whole mass of coke is heated to incandescence or in thorough combustion. As soon as this stage is reached, the supply of combustible gas may be stopped off and the air blast or forced draft of air is continued, being introduced into the mass through the ports described by which the operation is started, or by other ports if desired. By the action of the air the combustion and heating of the mass to drive off or thoroughly consume the hydro-carbons or other impurities is continued and as long as may be desired, the products of the combustion being carried off through a suitable opening 14 in the side of the furnace to the stack 15. From time to time suitable tools for agitating or breaking up the charge may be introduced through the rear opening 9 extending from top to bottom of the fire-pot as shown. After the completion of the operation and the reduction of the coke to a carbon of the desired conductivity, the mass of reduced material collected upon the flat floor of the furnace is readily removed by pushing the same out by means of a suitable tool operated through the opening 9, all of said reduced material being collected on said flat floor which, as will be seen, is free from obstruction, and being caused to flow or settle thereon in a comparatively narrow compass by the action of the inclined or hopper walls 8.

The furnace is especially adapted to the calcining of carbonaceous material to produce a perfectly pure carbon by the process described in the companion application filed by me on even date with the present case and bearing Serial No. 746,054.

What I claim as my invention is:

1. In a kiln or furnace for reducing petroleum coke or other carbonaceous material to a carbon conductor, the combination with a fire-pot having a flat floor, a hopper bottom and front and rear openings as described, of two horizontal ranges or series of ports consisting of chambers formed in the side walls of said fire-pot and having outlets flush with the inside surface of said wall, means for supplying air through pipes terminating within said ports, means for supplying gas through pipes terminating in the same ports and means for controlling the supply of air and gas as described to permit the combustion to be started by gas forced through said ports into the mass, together with air, and to continue the operation of reduction by cutting off the supply of gas and supplying air alone.

2. In a kiln or furnace for reducing petroleum coke or other carbonaceous material to a carbon conductor, a fire-pot having a flat imperforate floor free from obstruction and inclined or hopper sides extending from front to rear of the furnace and down to the said floor, means for introducing air or gas through ports located in the side walls and having openings flush with the side of the fire-pot, a vertical rear opening in said fire-pot, enlarged at its top and embracing a portion only of the rear wall or confines of the fire-pot and a front opening whereby the reduced contents collected on the floor may be pushed out of the pot over the flat floor by a tool inserted through said rear opening as and for the purpose described.

3. In a kiln or furnace for reducing petroleum coke or other carbonaceous material to a carbon conductor, a fire-pot having a flat imperforate floor, two horizontal ranges or series of ports opening into the said fire-pot flush with the side thereof and arranged one series above the other and means for supplying to said ports at will gas alone, or a mixture of air and gas, or air only, as and for the purpose described.

Signed at New York in the county of New York and State of New York this 31st day of January A. D. 1913.

HARRY T. JOHNSON.

Witnesses:
B. H. ELLIS,
J. F. HEANEY.